United States Patent Office 3,425,575
Patented Feb. 4, 1969

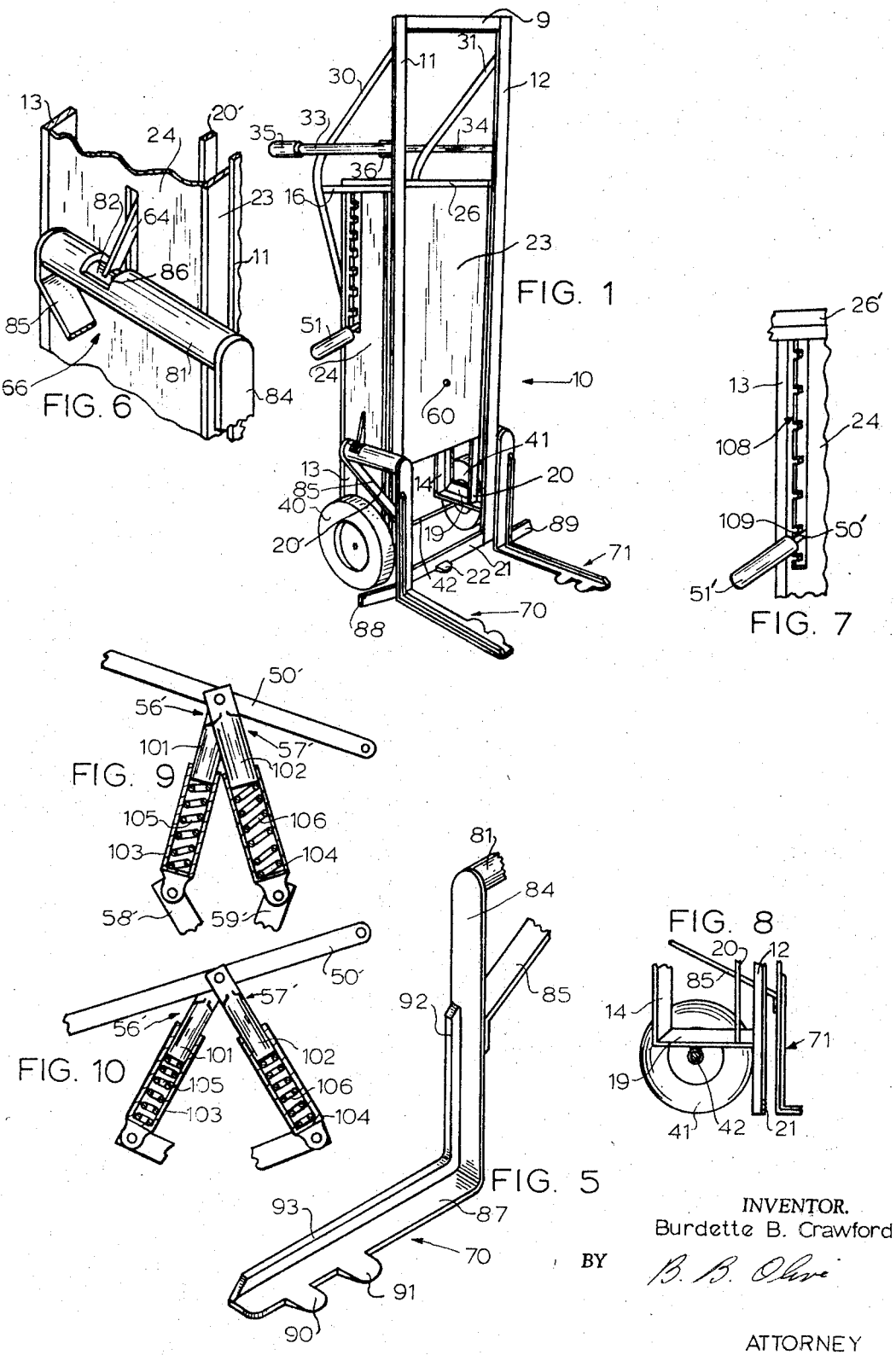

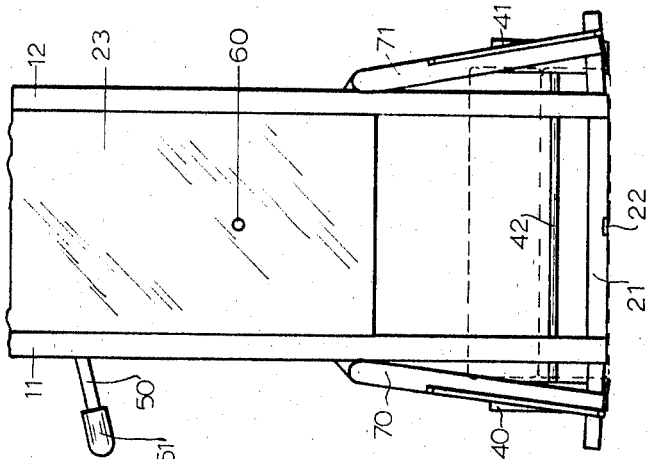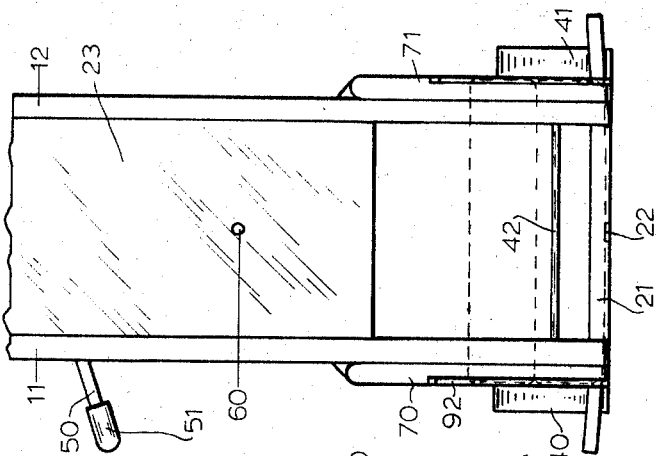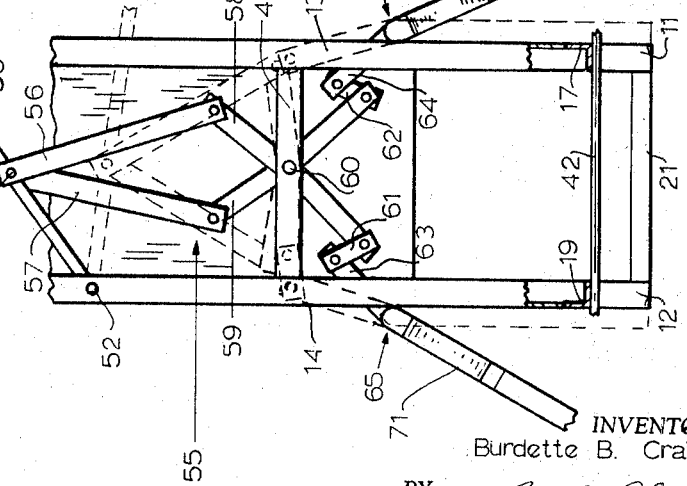

3,425,575
HAND TRUCK
Burdette B. Crawford, P.O. Box 384,
Chadbourn, N.C. 28431
Filed Sept. 13, 1967, Ser. No. 667,401
U.S. Cl. 214—379                                  7 Claims
Int. Cl. B62b 1/06, 1/00

ABSTRACT OF THE DISCLOSURE

A two-wheel, tilt type hand truck is adapted to pick up directly from a floor position, transport and release a stack of automotive tires or the like without manual contact with the tires. A pair of opposed tong members which are actuated by a lever and linkage are mounted on the truck and are designed to make a forcible entry under, support and grip respective bottom and side surfaces of the bottommost tire of the stack.

BACKGROUND OF THE INVENTION

Field of the Invention

This invention relates to a manually operable, two-wheeled truck which is provided with a pair of arcuately pivoting tongs for engaging, lifting by means of a rearward pivot of the truck and releasing an article or a stack of articles from a floor surface and, more specifically, to a hand truck having L-shaped tongs which are mounted on parallel and pivotal shafts and which are actuated by a handle lever by means of a linkage mechanism which connects the handle veler with the shafts to produce a mechanical advantage in the shafts and, resultingly, the tongs. Devices of this type may be classified under Class 214, Sub-class 337 which generally includes hand trucks having load engaging jaw elements and Class 280, Sub-class 56 which includes hand trucks having toe engaging elements.

Description of the prior art

The prior art hand trucks most commonly in use are those having stationary mounted tongs which are adapted to be slid under the object to be transported. The object or stack of the same must be tilted away from the hand truck in order for the tongs to be positioned between the bottom of the object and the floor. Thus, two people are required to load the objects onto the truck. Furthermore, it is most often necessary to stack the objects on a pallet and then lift both the pallet and the objects.

Hand trucks having load engaging jaws which swing around vertical axes and in a horizontal plane during loading are known. Art of this type is generally the most advance that can be found; however, hand trucks having moving arms which swing in a horizontal plane around vertical axes, during loading, have inherent disadvantages as opposed to the subject invention where the grasping tongs swing around horizontal axes and toward and away from each other along a vertically disposed arcuate path with respect to the floor surface. Unless the object is raised from the floor, the horizontally swinging arms are generally adapted to engage only the sides of the object since it is extremely difficult to force the arms under the object while scraping along the floor surface. Furthermore, unless expensive gears or the like are used to transmit the force exterted on the handle lever to the horizontal arms, the lever must swing in a plane which is perpendicular to the loading plane of the hand truck. Thus, the handle lever must, in effect, extend rearwardly and interfere with the operator's movements.

Such prior art as has taught the employment of tongs on hand trucks and mounted to move on horizontal axis lack the capacity of the present invention to force themselves under and engage the bottommost of a stack of tires resting on a floor surface. Other advantages of the invention over such prior art will also be seen.

From the foregoing, it is evident that the hand truck of the prior art may be improved upon to a significant degree and it is to this end that this invention as shown and described herein is directed.

SUMMARY OF THE INVENTION

The manually operable, two-wheeled truck of this invention includes a frame mounted on a pair of wheels, a pair of handles connected to the frame, a pair of opposed crank members pivotally mounted on the frame and having tongs adapted to move toward and away from each other along arcuate paths, a handle lever and linkage mechansim for actuating the cranks and a latch for holding the handle lever in a desired position.

The frame is shaped substantially like a rectangular box and is comprised of parallel and vertically extending rail members which define the sides of the frame, cross members integrally secured to and extending between the rail members and sheet cover members which form a front loading plane and which may enclose the remainder of the open areas of the frame. An axle having a pair of wheels mounted for rotation adjacent its opposed ends is connected to the frame so that it is above the base of the frame and parallel to and behind the front loading plane to position the wheels entirely rearwardly of the front loading plane. The wheels engage the floor surface both when the frame and its front loading plane are in a vertical loading-unloading position as well as when they have been pivoted rearwardly into a transport position. The frame further includes a pair of laterally spaced handles which are rigidly secured to the rail members and extend rearwardly of the front loading plane and which enable the operator to tilt the frame around the axle from a vertical loading position into a rearwardly tilted transport position.

The crank members include cylinders which are rigidly secured to opposed sides of the frame. The cylinder axes are parallel to each other, perpendicular to the front load plane and extend rearwardly from the front loading plane. Each of the cylinders receives a rotatable shaft which in combination with the cylinders form crank members. Each of the shafts integrally receives on its forward end an L-shaped tong. The tong includes a first leg which is secured to and which extends perpendicularly downward from the shaft so as to oscillate in a plane which is parallel to and slightly forwardly of the front loading plane. The second leg of the L-shaped tong is integrally connected to the exposed end of the front leg. The second legs are always parallel to each other and have axes which are parallel to the shafts to which the first legs are integrally connected and to the front loading plane. The second legs are comprised of vertically upwardly and horizontally inwardly extending flanges which are designed to grip and support respective side and bottom surfaces of the bottom tire or like article. The horizontal flanges are provided with integral flat and inwardly extending lips which are bevelled for making a forcible entry beneath the bottom tire prior to the horizontal and vertical flanges engaging the tire article. It can be seen that the lips wedge the outer portions of the tire or the like upwardly so that the horizontal flanges are able to slide under the tire to support it and the vertical flanges are able to engage and grasp the sides of the tire to prevent any lateral movement.

The crank members including the tongs actuated by a handle lever and mechanical linkage. A pair of operator arms are integrally connected to respective shafts rearwardly of the front loading plane and are adapted to pivot in a plane which is parallel to the front loading plane. The handle lever is pivotally mounted at one end to the frame and is adapted to swing in substantially the same plane in which the operator arms pivot. The handle lever is provided with an operator handle which extends outwardly from the side of the frame. The mechanical linkage which consists generally of a plurality of interconnecting arms selected ones of which are pivotally joined to the handle lever substantially mid-way between the operator handle and the handle lever's pivoted union with the frame. Other selected arms are pivotally connected to respective operator arms to increase the mechanical advantage between the lever and the tongs. Upon the downward pivoting movement of the handle lever from a raised position, the tongs pivot from an outward position toward each other to a substantially vertical or off-vertical position to engage the tire article or the like depending on the size of the same. Conversely, an upward pivoting movement of the handle lever pivots the tongs outwardly and away from each other.

The handle lever is provided with a latch which is adapted to lock the handle lever in any downward position when the tongs have engaged a tire article or the like and which accommodates to various sizes of the tire or the article. The frame includes a vertically extending slot in a selected side through which extends the handle lever. A selected vertical length of the side which forms one boundary for the slot is provided with a plurality of indentions which receive a handle lever flange. The lever which normally travels along a pivoted arc as defined by the slot has its flange engage a selected indention by slightly pulling the handle lever rearwardly when the tongs have grasped the tire article so as to lock the tongs in that position until a release is desired.

The lift truck of this invention is also adapted to lift transport and release articles having solid walls such as wooden crates or the like by spring loading selected interconnecting arms of the mechanical linkage. The spring loading of such arms adapts the tongs to exert a continuing and constant pressure against the side of the crate to insure positive grasping of the crate at all times.

Therefore, an object of this invention is to provide a hand truck which is adapted to pick up, transport and release resilient and rigid bodied articles or stacks of articles without requiring manual contact with the articles, use of pallets or the like.

Another object of this invention is to provide a hand truck with tongs which are adapted to swing in vertical arcuate paths toward and away from each other to make a forcible entry beneath an article whereby upon the lifting of the article, the article is gripped along selected side surfaces and supported along portions of its bottom surface by tongs.

A futher object of this invention is to provide a hand truck with a tong actuating handle lever which pivots in a plane which is parallel to the truck front loading plane and which is adapted to be locked at any selected vertical position after the tongs have engaged the to-be-transported article.

Still another object of this invention is to provide a spring-loaded linkage which connects the handle lever with the tongs whereby a constant force may be exerted on a rigid walled article by the tongs after an initial contact has been made between the article and the tongs.

These and other objects of this invention will become apparent when the following detailed description is read in conjunction with the accompanying drawings, in which:

DESCRIPTION OF THE DRAWINGS

FIGURE 1 is a perspective view of the hand truck of this invention;

FIGURE 2 is a front elevation view of the hand truck showing the tongs having been moved into a position where they are about to make a forcible entry beneath the tire article shown in dashed lines;

FIGURE 3 is the front elevation view of FIGURE 2 and showing the tongs having been forced under the tire article to grip the tire by pressing against the resilient walls of the tire;

FIGURE 4 is a fragmentary rear elevation view of the hand truck showing the handle lever in a raised position which results in the outward positioning of the tongs and in dashed lines, the downward or closed position of the handle lever and tongs;

FIGURE 5 is a perspective fragmentary view of a tong showing the flanges and flat lips;

FIGURE 6 is a fragmentary perspective view of a crank member showing a shaft journaled in a cylinder, an operator arm connected to the shaft and a tong connected to the end of the shaft;

FIGURE 7 is a fragmentary perspective view of the latch for securing the handle lever to the frame after the tongs have engaged the tire article;

FIGURE 8 is a fragmentary section view of the hand truck and specifically showing one of the wheels and the location of its connection to the frame;

FIGURE 9 is a fragmentary section view of an alternative embodiment of portions of the mechanical linkage showing a pair of interconnecting arms having been spring loaded and in a normal at rest position; and FIGURE 10 is the section view of FIGURE 9 showing the spring loaded interconnecting arms in a compressed position to exert a continuing force on a rigid walled article by the tongs.

DESCRIPTION OF THE PREFERRED EMBODIMENTS

In the preferred embodiment, frame 10 is comprised of forward rail members 11 and 12 and rear rail members 13 and 14 all of which are parallel to each other. Forward rail member 11 and rear rail member 13 are joined at the top by cross member 16 and at the bottom by member 17 while forward rail member 12 and rear rail member 14 are joined at the top by cross member 18 (not shown) and at the bottom by member 19. The lower extremities of forward rail members 11 and 12 are joined by cross member 21 which integrally supports a bevelled tongue or lip 22 and the upper extremities are joined by cross member 9. Tongue 22 extends perpendicularly forwardly from cross member 21 to extend under and support the rear portion of a tire article or the like. A rectangular plate 23 is positioned immediately behind rail members 11 and 12 and is secured to a pair of vertical bars 20, 20'. The front of the frame and plate 23 define a front loading plane against which tires or like objects may be stacked to prevent them from falling while frame 10 is in a rearwardly tilted transport position. Frame 10 further includes side panel 24 which is mounted on bar member 20' and rear rail member 13 and a similar opposed side panel 25 (not shown). Cross members 16 and 18 receive surface 26 which serves as a bearing surface upon which a note tablet or the like may be mounted thus avoiding the need for the operator to seek a table or the like when making necessary inventory notes, work orders and the like.

Arcuated rods 30 and 31 which are connected to rear rail members 12 and 14, cross members 16 and 18 and forward rail members 11 and 12, respectively, serve to strengthen the upper portions of forward rail members 11 and 12 and support the rear portions of handle bars 33 and 34. Handle bars 33 and 34 are parallel to each other, are connected at their forward ends to forward rail members 11 and 12 and extend perpendicularly and rearwardly from the front loading plane. Handle bars 33 and 34 are provided at their rearward ends with handle grips 35 and 36 which the operator grasps to manipulate the hand truck.

Frame 10 is made movable across a floor surface by wheels 40 and 41 which are respectively mounted on the ends of axle 42. Axle 42 is secured to cross members 17 and 19 rearwardly a distance from forward rail members 11 and 12 to position wheels 40 and 41 entirely behind the front loading plane. Also, the portions of wheels 40 and 41 which touch the floor surface are in the same horizontal plane as the lower ends of forward rail members 11 and 12 and the lower edge of cross member 21 when forward rail members 11 and 12 are vertically positioned with respect to and engage the floor surface. Thus, frame 10 is adapted to stand alone when placed in a vertical position with respect to the floor surface and wheels 40 and 41 are adapted to support frame 10 when it has been pivoted rearwardly about axle 42.

With respect to FIGURE 4, handle lever 50 which is provided with a handle 51 at one end is pivotally mounted on rod 52 which extends between forward and rear rail members 12 and 14 and which is perpendicular to the front loading plane. Handle lever 50 actuates tongs 70 and 71 by means of a mechanical linkage 55, the components of which reside and operate rearwardly of and substantially entirely in a plane which is parallel to the front loading plane and in which handle lever 50 pivots. Mechanical linkage 55 is comprised of actuating arms 56 and 57 which have one end pivotally connected to lever 50 at a common point 54. The other ends of actuating arms 56 and 57 are respectively and pivotally joined to the upper ends of intermediate arms 58 and 59. Intermediate arms 58 and 59 are crossed and are pivotally connected to plate 23 at their points of intersection by means of shaft 60 so as to be adapted to pivot about shaft 60. The lower ends of intermediate arms 58 and 59 are joined to one end of floating arms 61 and 62, respectively, and floating arms 61 and 62 have their other ends pivotally joined to operator arms 63 and 64, respectively. Bar 49 supports shaft 60.

Operator arms 63 and 64 are integrally connected to and form a part of crank members 65 and 66, respectively. Crank member 66 which is the mirror image of crank 65 is partially shown in FIGURE 6. Crank member 66 includes cylinder 81 which is rigidly mounted onto forward rail member 11 and side panel 24 and a shaft 82 which is journaled in cylinder 81. The cylinders and shafts of crank members 66 and 65 are parallel to each other and perpendicular to the front loading plane. The forward end of shaft 82 is integrally connected to vertical leg 84 of tong 70. The rear end of shaft 82 is integrally connected to support leg 85 which is joined to vertical leg 84 downwardly a distance from its intersection with shaft 82. Support leg 85 and vertical leg 84 limit the axial movement of shaft 82 in cylinder 81. Cylinder 81 is provided with an opening 86 which exposes a portion of shaft 82 and allows operator arm 64 to be integrally joined to shaft 82 and to pivot shaft 82 in cylinder 81 upon the pivotal movement of handle lever 50.

In reference to FIGURE 5, L-shaped tong 70 which is the mirror image of tong 71 is comprised of vertical leg 84 and horizontal leg 87 which is perpendicularly mounted on the lower end of leg 84 and which has an axis that is parallel with the axis of shaft 82 and is perpendicular to the front loading plane. Upon the movement of handle lever 50, the horizontal legs of tongs 70 and 71 move toward and away from each other in arcuate paths. Horizontal leg 87 is provided with inwardly extending bevelled lips 90 and 91 which are adapted to make a forcible entry beneath the tire article or the like. Vertical leg 84 and horizontal leg 87 are respectively provided with flanges 92 and 93. Flange 92 functions to strengthen vertical leg 84 while flange 93 is useful to grasp and slightly depress the resilient side walls of a tire article to prevent any lateral movement during the normal tilting and transportation motions. The weight of the tire article is borne by horizontal leg 87, its counterpart and tongue 22. When actuated, tongs 70 and 71 move inwardly toward each other and along guides 88 and 89, respectively. Guides 88 and 89 are respectively secured to and extend laterally outwardly from forward rail members 11 and 12. Guides 88 and 89 prevent tongs 70 and 71 from being bent rearwardly when heavily loaded.

Where the articles to be lifted and transported are rigid walled boxes or the like, actuator arms 56' and 57' as shown in FIGURES 9 and 10 include shaft portions 101 and 102, respectively, which have one end pivotally connected to handle lever 50' and have the other end slidably received by cylinders 103 and 104, respectively. The closed ends of cylinders 103 and 104 are pivotally connected to intermediate arms 58' and 59', respectively, and function therewith as previously described. Cylinders 103 and 104 are respectively provided with compression springs 105 and 106 which when compressed work against the closed end of cylinders 103 and 104 and the lower ends of shafts 101 and 102 to exert a continuing inwardly pivoting force on tongs 70 and 71 when tongs 70 and 71 have engaged a rigid walled article and when lever 50' is in a locked positon. To lock lever 50' after tongs 70 and 71 have engaged an article, lever 50' which extends through vertically arranged opening 108 in side panel 24 is positioned in a selected locking slot 109 which comprise one edge of opening 108. Lever 50' is released by pushing it forwardly to clear locking slots 109. Thus, lever 50' may be locked in any position corresponding to the width of the article engaged by the tongs. In the locked position the compression springs 105, 106 give the tongs a resilient grasping effect against the sides of the article being transported.

It is considered to be within the scope of this invention to employ a foot pedal actuator rather than the specific hand lever operator shown. The term "manual operator portion" hereinafter employed in the claims should be construed accordingly. Other forms of connecting linkage may be employed. However, it is desirable that the dimensions and pivot locations such as members 56, 57, 58, 59, 61, 62, 63 and 64 and their respective pivots be chosen such that as tongs 70, 71 are closed the whole linkage tends to lock tongs 70, 71 in closed position. Thus, the dotted line portion of the linkage in FIGURE 4 indicates such a closed and locked position which is obtainable with the type of linkage disclosed.

What is claimed is:
1. A hand truck including means adapted to grasp the side of, pick up, support, transport and release one or a stack of articles resting on a floor surface without requiring manual contact with the articles, comprising in combination:
   (a) a rigid, rectangular frame providing a vertically positionable front loading plane;
   (b) an axle-wheel arrangement connected to and disposed completely rearwardly of said plane, said wheels engaging said floor surface when said frame is in a vertical loading-unloading position and when in a rearwardly tilted load transport position;
   (c) handle means mounted on said frame and extending rearwardly of said loading plane for enabling said frame to be tilted around said axle from said vertical loading-unloading position to said rearwardly tilted load transport position;
   (d) a pair of opposed crank members having portions providing elongated bearing members and L-shaped tongs, said bearing members including parallel and horizontally disposed shafts mounted for rotation on the sides of said frame above said wheel arrangement and extending rearwardly of and perpendicularly to said front loading plane, said tongs including first legs perpendicularly and integrally connected to respective forward portions of said shafts and normally extending downwardly toward said floor surface and including second legs perpendicularly and integrally connected to the extreme downward portion of said first legs, said second legs having axes being parallel to each other and to the axes of said shafts to which said first legs are integrally connected, said second legs being comprised of vertically upwardly and horizontally inwardly extending flanges and integral flat lips spaced along the length of and extending inwardly from and in the plane of said horizontal flanges, said flanges being designed to grip and support respectively side and bottom surfaces of said article being transported and said lips being bevelled and designed for forcible entry beneath said article when resting on said floor surface prior to engagement by said horizontal flanges, said tongs being swingable in vertical arcuate paths toward and away from each other and about the axes of said respective shafts;

(e) actuating means for moving said tongs including a pair of operator arms integrally connected to the respective rearwardly portions of said shafts behind said front loading plane and arranged to swing about the respective axes of said shafts and parallel to said loading plane, and an operating lever pivotally mounted at one end on said frame for swinging parallel to said frame and including a handle portion at the other end extending outwardly and to one side of said frame and a connecting linkage, said linkage being so arranged and effective to connect said operator arms and operating lever whereby movement of said operating lever downwardly effects downward arcuate movement and loading positioning of said tongs and movement of said operating lever upwardly effects upward arcuate movement and release positioning of said tongs; and (f) latching means mounted on said frame adjacent the path of travel of said handle portion of said operating lever enabling said operating lever to be releasably latched in any of a plurality of loaded positions corresponding to said tongs being in any of a plural group of loaded positions corresponding to various size articles.

2. A hand truck as claimed in claim 1 wherein said article or stack of articles comprises a resilient wall vehicular tire or stack of tires, said tong flanges and lips are designed to engage, support and grip tire structures of varying sizes and said latching means is arranged such that latching of said operating lever operates against the wall resiliency of the tire gripped by said tongs.

3. A hand truck as claimed in claim 2 wherein said lips comprises a pair of lips located adjacent the outer end of each of said second tong legs, said frame mounts a further toe-lip extending centrally, perpendicularly, and outwardly from said loading plane at the base of said frame, and including a pair of guide arms located at the base of said frame and extending outwardly parallel to said plane for guiding the arcuate movement of said tongs.

4. A hand truck as claimed in claim 1 wherein said linkage comprises a scissors type linkage and is arranged to provide a mechanical advantage between said operating lever and said tongs.

5. A hand truck as claimed in claim 1 wherein said frame includes vertically extending, parallel rail members, connecting cross bar members integrally secured to and extending between said rail members and a sheet covering member formed to cover said linkage and provide adjacent the top of said frame and between said rail members a flat surface suitable for writing and the like.

6. A hand truck as claimed in claim 1 wherein said linkage includes at least one spring loaded member such that when said tongs engage rigid walled articles, final latching of said operating lever is effected against the compression of said spring loaded member.

7. A hand truck including means adapted to grasp the side of, pick up, support, transport and release one or a stack of articles resting on a floor surface without requiring manual contact with the articles, comprising in combination:

(a) a rigid, rectangular frame providing a vertically positionable front loading plane;

(b) an axle-wheel arrangement connected to and disposed completely rearwardly of said plane, said wheels engaging said floor surface when said frame is in a vertical loading-unloading position and when in a rearwardly tilted load transport position;

(c) handle means mounted on said frame and extending rearwardly of said loading plane for enabling said frame to be tilted around said axle from said vertical loading-unloading position to said rearwardly tilted load transport position;

(d) a pair of opposed crank members having portions providing elongated bearing members and L-shaped tongs, said bearing members including parallel and horizontally disposed shafts mounted for rotation on the sides of said frame above said wheel arrangement and extending rearwardly of and perpendicularly to said front loading plane, said tongs including first legs perpendicularly and integrally connected to respective forward portions of said shafts and normally extending downwardly toward said floor surface and including second legs perpendicularly and integrally connected to the extreme downward portion of said first legs, said second legs having axes being parallel to each other and to the axes of said shafts to which said first legs are integrally connected, said second legs being comprised of vertically upwardly and horizontally inwardly extending flanges and integral flat lips spaced along the length of and extending inwardly from and in the plane of said horizontal flanges, said flanges being designed to grip and support respectively side and bottom surfaces of said article being transported and said lips being bevelled and designed for forcible entry beneath said article when resting on said floor surface prior to engagement by said horizontal flanges, said tongs being swingable in vertical arcuate paths toward and away from each other and about the axes of said respective shafts;

(e) actuating means for moving said tongs including a pair of operator arms integrally connected to the respective rearwardly portions of said shafts behind said front loading plane and arranged to swing about the respective axes of said shafts and parallel to said loading plane, and an operating lever pivotally mounted on said frame and including a manual operator portion extending from said frame and a connecting linkage, said linkage being so arranged and effective to connect said operator arms and manual operator portion whereby movement of said manual operator portion downwardly effects downward arcuate movement and loading positioning of said tongs and movement of said manual operator portion upwardly effects upward arcuate movement and release positioning of said tongs; and (f) latching means mounted on said frame adjacent the path of travel of said manual operator portion enabling said manual operator portion to be releasably latched in any of a plurality of loaded positions corresponding to said tongs being in any of a plural group of loaded positions corresponding to various size articles.

References Cited

UNITED STATES PATENTS 1,193,729    8/1916    Stebler _____ 214—377
2,665,018    1/1954    Salsas _____ 214—377 XR ALBERT J. MAKAY, Primary Examiner.

U.S. Cl. X.R.

280—47.29